(12) United States Patent
Jablin

(10) Patent No.: US 6,859,009 B2
(45) Date of Patent: *Feb. 22, 2005

(54) URBAN TRANSPORTATION SYSTEM

(76) Inventor: Richard Jablin, 2500 W. Club Blvd., Durham, NC (US) 27705

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 248 days.

(21) Appl. No.: 09/347,345

(22) Filed: Jul. 2, 1999

(65) Prior Publication Data

US 2003/0014302 A1 Jan. 16, 2003

(51) Int. Cl.[7] .................................................. H02J 7/00
(52) U.S. Cl. ...................... 320/109; 439/34; 180/65.1; 198/347.1; 705/13; 320/104; 320/116; 414/222.01
(58) Field of Search ........................... 705/13; 455/456; 198/301, 341.01, 341.08, 347.1; 439/34; 180/65.1; 320/104, 109, 116

(56) References Cited

U.S. PATENT DOCUMENTS

| | | | | |
|---|---|---|---|---|
| 3,608,748 A | * | 9/1971 | Wilson | 214/16.1 |
| 3,710,957 A | | 1/1973 | Small | 214/16.1 |
| 5,138,952 A | * | 8/1992 | Low | 105/72.2 |
| 5,289,369 A | * | 2/1994 | Hirshberg | 364/401 |
| 5,473,233 A | * | 12/1995 | Stull et al. | 318/587 |
| 5,523,666 A | * | 6/1996 | Hoelzl et al. | 320/2 |
| 5,598,084 A | * | 1/1997 | Keith | 320/2 |
| 5,686,895 A | * | 11/1997 | Nakai et al. | 340/636 |
| 5,711,648 A | * | 1/1998 | Hammerslag | 414/786 |
| 5,726,885 A | * | 3/1998 | Klein et al. | 364/423.098 |
| 6,127,800 A | * | 10/2000 | Kuki et al. | 320/108 |

FOREIGN PATENT DOCUMENTS

| | | | | |
|---|---|---|---|---|
| DE | 3823947 | * | 7/1988 | B23K/37/04 |
| GB | 1377284 | * | 12/1974 | G07F/17/00 |
| WO | WO-8904901 | * | 6/1989 | E04H/6/42 |
| WO | WO 98/33996 | * | 8/1996 | E04H/6/12 |
| WO | WO 98/33996 | * | 8/1998 | E04H/6/12 |

OTHER PUBLICATIONS

Arnold, Robert K. "How Urban America Can Drive Itself OUt of Commuter Gridlock . . . " The Washington Post, c02. Feb. 2, 1992.*

Volz et al. "Electric vehicles—an alternative for tomorrow's transportation," p. 20. 1991.*

Anon. "Electric Cars for Hire—A Computer Networked Approach to Transport," Electric Vehicle Developments, v 6 n 1. Jan. 1987.*

Chisholm, J. "ITS Deployment Testing of Instant Rent-a-Car Technology," Transportation Research Board, p. 56. 1997.*

(List continued on next page.)

*Primary Examiner*—Tariq R. Hapiz
*Assistant Examiner*—C. Michelle Colón
(74) *Attorney, Agent, or Firm*—Jeffry K. Seto

(57) ABSTRACT

An urban transportation system which comprises a pool of rental urban vehicles all having the same size and physical configuration and having a range of driving which is limited as compared to the range of vehicles that are powered by internal combustion engines. The system includes a computer-controlled mechanized facility for delivering, receiving, processing, servicing and storing the vehicles. Vehicles are automatically recharged while in storage. The system includes areas for on-street parking of the vehicles. There are also several features to combat theft of the vehicles. A user may obtain the most readily available vehicle from any place in the system and return the vehicle to any other place within the system.

8 Claims, 2 Drawing Sheets

OTHER PUBLICATIONS

Mackonochie, Robin. "Batteries required," Accountancy, Aug. 1996.*

"Next Tulip from France will be electric two-seater," Machine Design, Sep. 28, 1995.*

Freeman, Vaughan. "The chic little road to the future;Car 95," The Times, Apr. 8, 1995.*

"The French Connection: Part 2," Calstart Connection, May–Jun. 1996.*

Parent, Michel et al. "A public Transport System Based on Light Electric Cars," Abstract from the Fourth International Conference on Automated People Movers, Mar. 18–20, 1993, [retrieved from the Internet on Dec. 3, 2002].*

* cited by examiner

URBAN TRANSPORTATION SYSTEM

BACKGROUND OF THE INVENTION

1. Field of the Invention

This invention relates to an Urban Transportation System that provides a plurality of vehicles of uniform description for individual use and that are available for rent and intermediate storage at a storage and maintenance facility through an automated rent and return system.

2. Description of Prior Art

Urban centers of population are experiencing transportation difficulties that reduce the quality of life for individuals and that create problems for the population as a whole. Generally, individuals depend heavily on a personal vehicle for travelling from one point to another. These personal vehicles are typically powered by internal combustion engines which burn gasoline and contribute to pollution of the air. Most of the personal vehicles are large in order to be useful and comfortable for long distance travel and capable of performing a variety of activities, e.g. transporting a number of people. The vehicles are generally privately owned and specific to the individual user. Storing such vehicles requires a large amount of space that must be arranged to suit a variety of vehicles and must leave sufficient extra space to enter and move any vehicle. Vehicle storage along the streets occupies a substantial portion of the roadway. Storage in a parking garage, in addition to the lateral and overhead space, necessitates a large aisle through which the vehicles may drive and turn into an available parking place. The user often spends much time in locating an available parking space for the vehicle. The large size of the vehicles, in combination with the space reserved for on-street parking, slows the movement of traffic and causes difficulties in performing essential urban services such as street cleaning and garbage collection. Theft of vehicles also presents a problem for the owner and for the police, who must try to locate stolen vehicles.

In some urban centers, there is an effective mass-transportation rail system that has been installed at great expense to the city. In other urban centers, a rail system has proven to be infeasible, either due to the difficulty of condemning property for building the system, or due to the fact that the destinations of potential users are so diverse that a mass-transportation system cannot provide effective service. Often, a bus transportation system can overcome some of the difficulties, but the geography of some urban centers and individual schedules present problems for which there has been no suitable solution.

Many different systems have been proposed, or actually constructed, for providing effective mass-transportation for an urban center. The more modern versions include a degree of automation in order to insure safety of the passengers, to reduce operating personnel and costs, and to improve operation of the system in general. In spite of these advances, many people in the urban centers do not use the mass-transportation system on the basis that it is inconvenient for them, involving transfers from one line of the system to another and, finally leaving them at a location that is an inconvenient distance from their ultimate destination. Also, many people do not like or desire to be in close contact with other passengers who are using the transportation system. Thus, it is common to observe many personal vehicles in use while having only one occupant.

The managers of some cities have recognized these problems and have attempted to solve them by various regulating ordinances and by setting goals to replace gasoline-powered vehicles with electric vehicles in order to reduce air pollution. These ordinances and goals have been only partially effective. The manufacturers of automobiles have cooperated in this effort by improving and producing electrically powered vehicles. These electric vehicles are designed for a variety of purposes that involve high speed and a large range of travel on a single charge to the batteries. The batteries, in consequence, are large, heavy and expensive. Sale of these vehicles has been disappointing because of the high cost of the vehicle and the large size and weight of the batteries. A longer driving range requires larger and heavier batteries and, at the same time, the heavier vehicle (as a result of heavy batteries) consumes more electricity, again increasing the required size of the batteries. Vehicle manufacturers are also developing highly efficient gasoline or alternate fuel internal combustion engines (e.g. methanol, propane or possibly hydrogen) and hybrid vehicles (using a combination of internal combustion engine and electric motor drive systems). These types of vehicles provide a compromise between the traditional air-polluting gasoline-burning vehicles and the heavy and expensive electric vehicles.

U.S. Pat. No. 5,726,885 issued Mar. 10, 1998 to Klein et al. provides a "Hire Vehicle Transportation System". The Klein et al. patent discloses an apparatus and method for reserving, dispensing and returning particular vehicles of respective users. The system of the Klein et al patent provides the user with a key for a particular vehicle. The key and the vehicle are returned when the rental use ends.

The Klein et al. patent does not, however, provide or contemplate various novel and useful features of the present invention. One significant and novel feature of the present invention is the provision of a pool of substantially uniform vehicles for rental so as to obviate the selection of a particular vehicle or type vehicle and to thus permit more compact vehicle storage. Compact vehicle storage results from vehicle uniformity, since the user is always issued the most accessible vehicle. Further features, combined with the use of generally low-pollution urban vehicles, provide benefits not heretofore available, as will be more fully disclosed below.

SUMMARY OF THE INVENTION

This invention provides an urban transportation system that utilizes a pool of relatively small, uniform, vehicles for rental, each of which includes an on-board computer for recording and transmitting data on use time and mileage. The urban transportation system also includes a number of storage and maintenance facilities for the vehicles and a computer network that accumulates information for operations and for billing the user. The vehicles are essentially all of one size and physical configuration so as to create an efficient and cost-effective system for storage and use of the vehicles. Because all vehicles are essentially equal in physical configuration, there is no need for the user to select a particular vehicle from the storage facility; thus, the first vehicle from storage is the one that is presented to and used by the user. The small vehicles designed for urban use (hereafter referred to as urban vehicles) have limited range, suitable for the particular urban area in which they are being used. A limited range permits use of relatively small drive units, resulting in a compact, light weight vehicle that is low in cost and efficient to operate and store.

One object of this invention is to provide a system for urban transportation that uses an urban vehicle which is compact and is basically similar or identical in physical configuration to all other urban vehicles in the system in a particular urban area and which has a minimally sized drive unit designed to provide a range to meet the needs of a particular urban population center.

Another object of this invention is to provide a pool of urban vehicles of essentially similar or identical physical configuration such that the vehicles may be stored in a compact manner with minimal space between adjacent vehicles and to the structure of the facility in which they are stored.

Another object of this invention is to facilitate the use of urban vehicles in a particular urban area so as to reduce pollution of the air and to reduce the amount of land within the urban area that is consumed by parking of vehicles on the street and in parking facilities.

Another object of this invention is to immediately present to the user of the urban vehicle the nearest vehicle in a quick and efficient manner.

Another object of this invention is to provide computerized record-keeping for the transportation system such that the user is billed accurately in accordance with predetermined conditions for billing and to efficiently produce records which include vehicle maintenance and accounting information.

Another object of this invention is to provide a billing system for the use of urban vehicles such that the user is charged an additional fee for not returning the vehicle to a vehicle storage facility, for causing damage to the vehicle, and for leaving the vehicle in a condition that requires special effort by the rental service personnel to prepare it for the next user, and to credit the user for recharging batteries or replenishing fuel.

Another object of this invention is to enhance the use of the urban transportation system by affording a mode of personalized travel that is convenient and flexible to use, adaptable to personal needs, schedules and destinations and, at the same time, simplifies parking and traffic and eliminates the need for owning and maintaining a personal vehicle for urban use.

Another object of this invention is to permit the user to retain a particular vehicle when it is parked on the street or elsewhere and the user is temporarily away from the vehicle.

Other objects and a fuller understanding of the invention will become apparent by referring to the following description and claims, taken in conjunction with the accompanying drawings.

DETAILED DESCRIPTION OF PREFERRED EMBODIMENTS OF THE INVENTION

Figure 1:
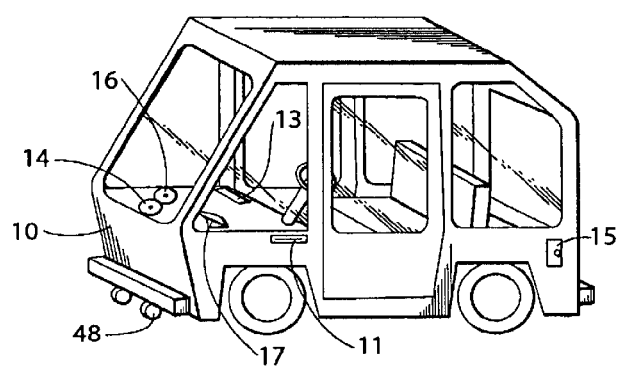
FIG. 1 is a pictorial view of an urban vehicle which is used in the system of the present invention.

Referring now to the drawings, in which like reference numerals denote corresponding parts throughout the various views, the numeral 10 indicates an urban vehicle that is used for transporting the user of the vehicle, together with a passenger and packages, if any, to a desired destination. Each vehicle 10 that is used in the urban transportation system disclosed herein has the same general size and physical configuration as all of the others, except, possibly for some minor features and color of paint. This vehicle uniformity is the key to achieving maximum efficiency in operation of the system and to keeping the consumption of space for storing the vehicles, either in a storage facility or in on-street parking locations, to a minimum.

The present invention recognizes that an electric-powered urban vehicle will achieve an optimum in pollution control and significant efficiency in the system described. Therefore, portions of the disclosure relate specifically to an electric-powered urban vehicle, as the preferred embodiment. Nevertheless, an urban vehicle powered by a gasoline or alternate fuel internal combustion engine or by a hybrid drive unit will achieve the objectives set out herein and is considered within the scope of the invention.

With reference to FIG. 1, each vehicle 10 has an entry card slot 11 for receiving a key-card 12 (see FIG. 4) to gain access to vehicle 10. In the preferred embodiment, key-card 12 is also used in another similar slot, drive card slot 13, located adjacent to the steering wheel and employed for actuating the ignition and for starting the vehicle. Vehicle 10, being an electric-powered vehicle in the preferred embodiment, has a voltage meter 14 for showing the amount of electric charge remaining in the batteries of the vehicle. Compartment 15 contains an electric power cord and reel (not shown) to connect the battery of vehicle 10 to a source of electric power. Vehicle 10 also has a pair of electric roller contacts 48 residing at the front bottom of the vehicle for connecting its batteries to an electric power grid in the storage facility, a watt-hour meter 16 for recording power flow to the batteries when they are being charged, and an on-board computer 17 for coordinating and recording various operations of the vehicle. On-board computer 17 is connected to enable communication with a central computer located in a storage and maintenance facility (see FIG. 4). The vehicle also is equipped with a charge controller (not shown) for controlling the power being provided to the batteries when they are being charged.

Figure 4:
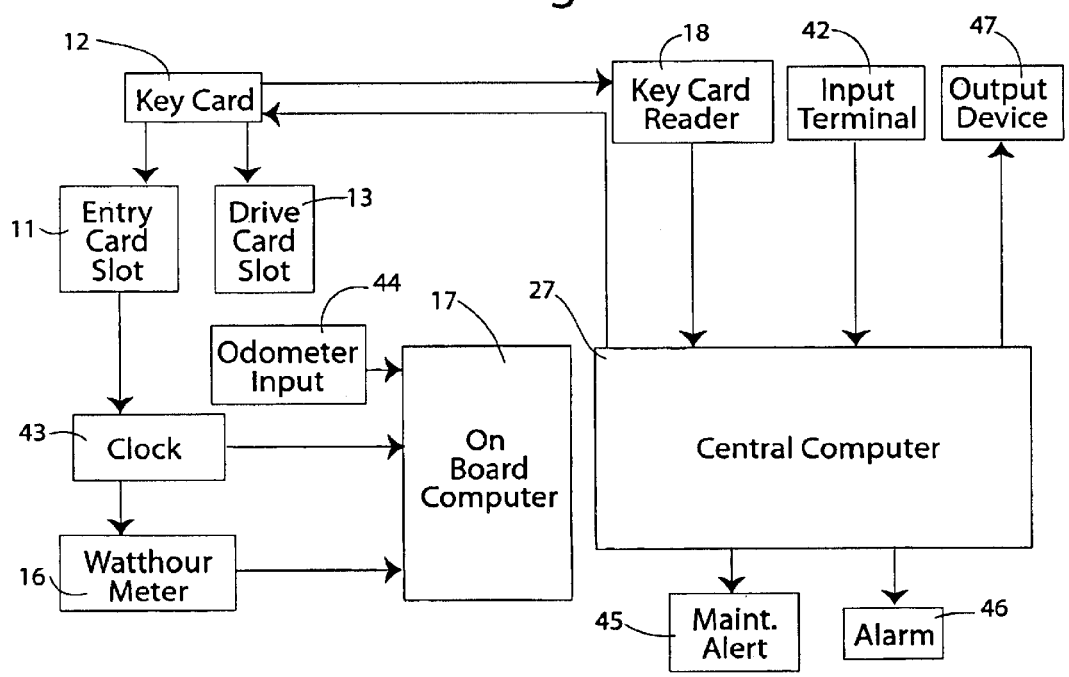
FIG. 4 is a schematic flow diagram showing the functions of the computer equipment and peripherals which are associated with the transportation system of the present invention.

FIG. 4 shows a schematic layout of the urban transportation system of the invention. In general, the urban transportation system will be operated publicly by a governmental body, or privately as a car rental system. To access the system, the user of an urban vehicle must first obtain a key-card 12, which is typically made of sheet plastic and is similar to the type of key-card that is used to gain access to a room in a hotel. The user may obtain key card 12 from any of the facilities in the system. The key-card remains in order and active as long as the user's account is current. The user inserts key-card 12 into card reader 18 and requests authorization. Card reader 18, after checking the user's account status, encodes the card for use in any one of the available vehicles in the area. This authorization will automatically expire at the end of the use of a particular vehicle, or at the end of a preset length of time. A new authorization must be requested for each rental and encoded into key-card 12 as described above.

Figure 2:
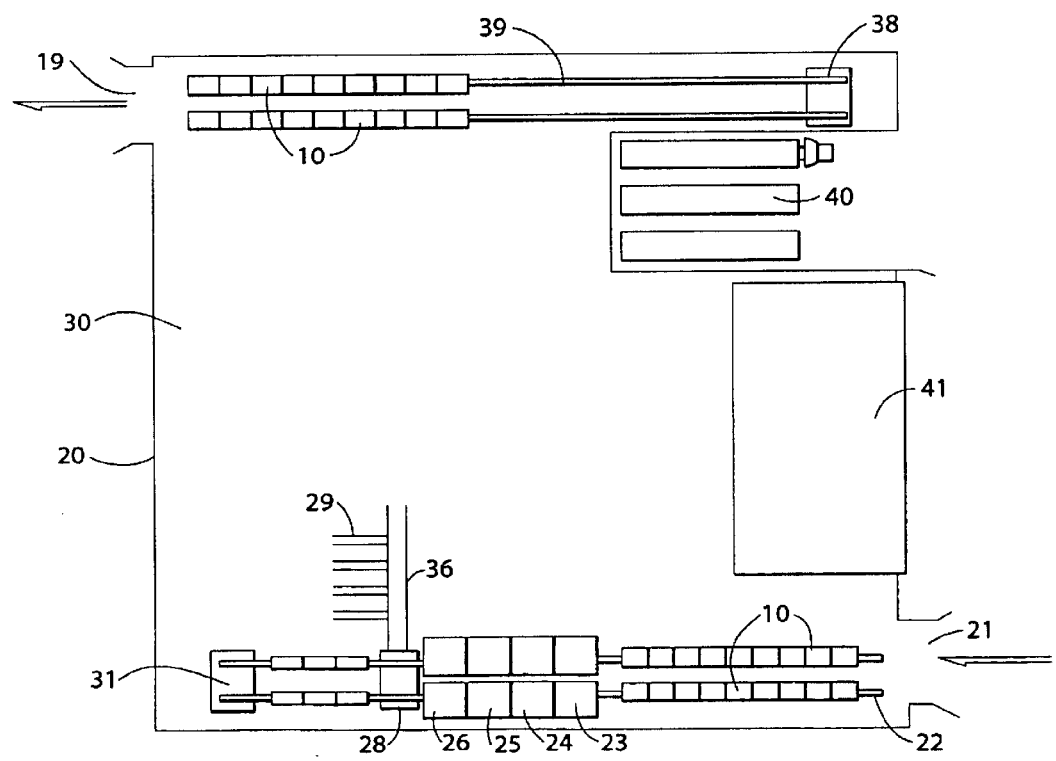
FIG. 2 is a plan view of the main floor of a vehicle storage facility which contains equipment for receiving and discharging vehicles as well as a maintenance area and an office.

Referring now to FIG. 2, the user obtains the first in line urban vehicle 10 from storage facility 20 at exit door 19 by use of an encoded key-card 12. The user may also obtain a vehicle that is parked in a designated on-street parking area. If the vehicle is obtained from the storage facility, its batteries will have been charged while the vehicle was in storage. If the user obtains the urban vehicle from an on-street parking location, the user must check the voltage meter 14 to verify that the batteries are adequately charged for the intended trip. To assist the user in making this determination, voltage meter 14 is calibrated in terms of number of miles available for driving.

Referring further to FIG. 2, the user may return vehicle 10 to storage facility 20 at entrance door 21 at the end of the line of incoming vehicles. It is preferred to return vehicle 10 to a storage and maintenance facility so that vehicle 10 can be fully processed in service stations 23–26 inside entrance door 21. Alternately, the user may leave the vehicle 10 at any designated on-street parking area. In this case, the user is invoiced an extra fee for not having returned vehicle 10 to a storage facility 20. If the batteries of a vehicle 10 parked in an on-street parking location have low voltage as indicated on meter 14, thereby limiting further use, or if the vehicle has not moved from its location for a predetermined length of time, personnel will be sent to collect the vehicle and deliver it to the nearest vehicle storage facility 20. A number of storage facilities 20 and a number of designated on-street parking locations (not shown in figures) are provided in a particular urban area so that any desired destination of a user is likely to be within easy walking distance of where the vehicle may be returned. Thus, the transportation system is user-friendly.

Still referring to FIG. 2, when vehicle 10 is returned to storage facility 20 at entrance door 21, vehicle 10 is driven onto an accumulating conveyor 22 which carries it to a position adjacent the last vehicle already in the line. FIG. 2 shows two parallel accumulating entry conveyors 22 with associated automotive service equipment as will be described below. The number of such conveyors that are provided in a given storage facility 20 may vary in accordance with the number of vehicles that must be processed in a given time. Accumulating conveyor 22 carries each vehicle 10 through wash station 23 where the exterior of vehicle 10 is washed, vacuum station 24 where the interior is cleaned, inspection station 25 where vehicle 10 is generally inspected for any damages, and de-brief station 26 where the data in memory of on-board computer 17 are downloaded into central computer 27 (see FIG. 4) and where vehicles 10 are routed either to service area 30 or to storage floor 32 (see FIG. 3). Central computer 27 serves all of the various storage facilities 20 in a particular urban area. If a particular vehicle 10 needs service, either because of defects, damages, or because central computer 27 directs that vehicle 10 requires some scheduled maintenance, a service transfer car 28 diverts the specific vehicle 10 along track 36 to one of the storage conveyors 29 which serves as a waiting station and from which vehicle 10 may later be moved into service area 30. If a given vehicle 10 does not require service, the accumulating conveyor 22 carries vehicle 10 into up-elevator 31 for delivery to a vehicle storage floor 32, a typical one of which is shown in FIG. 3.

Figure 3:
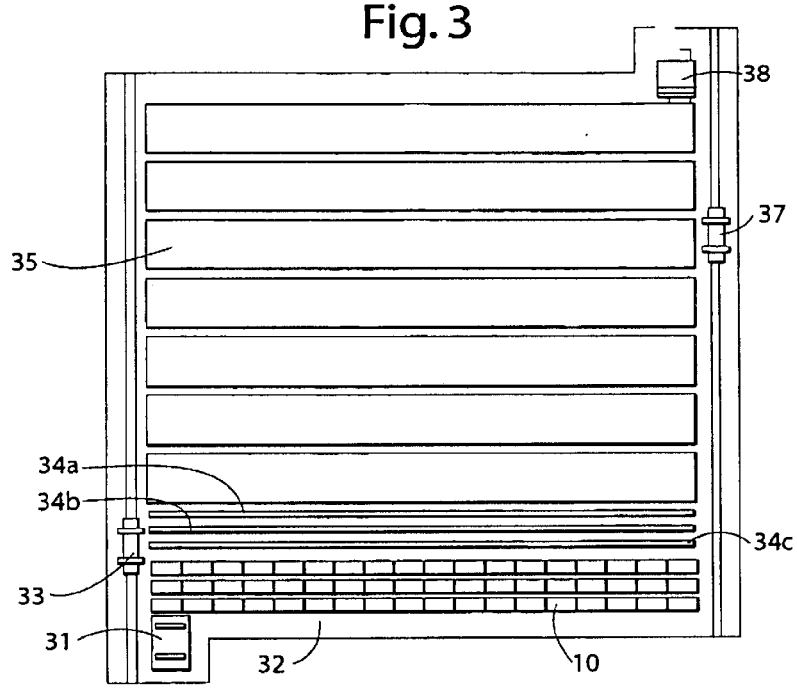
FIG. 3 is a plan view of an upper floor of the vehicle storage facility which contains conveying equipment for moving and storing the vehicles.

Referring now to FIGS. 2 and 3, up-elevator 31 that is shown has two short tracks that allow up-elevator 31 to receive two vehicles at a time. A storage entry transfer car 33 on vehicle storage floor 32 also has two conveyors to match those in up-elevator 31. Thus, the lifting operation that tends to be time-consuming, is made more efficient by virtue of handling two vehicles per trip. In place of the illustrated up-elevator 31, which must go down empty in order to complete a trip, it is possible according to the present invention to utilize a continuous loop elevating conveyor, depending on the particular situation.

Referring to FIG. 3, transfer car 33 delivers vehicle 10 to one of the accumulating storage conveyors 34a, 34b, 34c on storage floor 32. Typical storage conveyors 34a, 34b, 34c are arranged in sets 35 of three conveyors with a narrow aisle between the sets. Conveyors 34a, 34b, 34c are positioned to leave a minimum clearance between adjacent vehicles 10 and to the building structure, including the floor and ceiling. This compact, space-saving arrangement is possible because all the vehicles are of the same physical configuration and they are moved by a conveyor rather than being driven and parked by personnel.

When urban vehicle 10 enters up-elevator 31 (FIG. 2) a mechanism in the elevator automatically actuates to lower a pair of electric roller contacts 48 on the lower portion of vehicle 10 (see FIG. 1). Referring to FIG. 3, each storage conveyor 34a, 34b, 34c has a set of electric conductor bars (not shown) positioned parallel to the conveyor in a location to be contacted by the vehicle's electric roller contacts 48. When vehicle 10 is on storage conveyor 34a, 34b, 34c with its roller contacts 48 lowered so that they engage and remain in electrical contact with the conductor bars, the batteries of vehicle 10 are being charged. The on-board charge controller of vehicle 10 has a charge limiter preset to disconnect the batteries from the charging circuit when the batteries are fully charged. The scheduling of vehicles in storage facility 20 keeps each vehicle 10 on storage conveyor 34a, 34b, 34c at least for a time that is sufficient to fully charge the batteries of the vehicle. If some vehicles must be taken out of storage before the scheduled minimum time has elapsed, an attendant may select vehicles from storage for departure by examining the status of the charge meter on the vehicle. Otherwise, all movement of vehicles in and out of storage is automatic and is controlled by the computer, thereby saving operating labor.

If the urban transportation system of the present invention employs vehicles with drive systems that do not derive power from batteries, automatic or manual refueling is substituted for battery charging.

Referring again to FIG. 3, each vehicle 10 leaves storage conveyors 34a, 34b, 34c by entering a storage discharge transfer car 37 which carries it to down-elevator 38 and from there to the accumulating exit conveyor 39 (FIG. 2) on the main floor of storage facility 20. When vehicle 10 enters down-elevator 38, a mechanism actuates to cause electric roller contacts 48 to retract to a locked position adjacent the bottom of vehicle 10.

If there is an excess of vehicles in a particular storage facility, or if another storage facility is short of vehicles, vehicles may be loaded onto transfer trucks 40 (FIG. 2) which are configured to carry a group of vehicles from the over-stocked facility to the under-stocked facility.

When the vehicle user observes that the vehicle being driven has few miles left in its battery charge, the user may deposit the vehicle in the nearest storage facility and continue the trip in another vehicle. When the user has finished using a vehicle, the user presses a button in the vehicle marked 'finished use' and places the key-card into a local stationary key-card reader. This key-card reader presents the user with two choices, either to "obtain" a new, or exchange, vehicle or to simply "return" the vehicle to the system. The user transmits the choice selection to the computer by pushing an appropriately marked button. The user is no longer invoiced for vehicle time once the "return" choice is entered. Until the "return" button is pressed, the vehicle is not available for use by any other user.

Referring now to FIG. 4, the computer system is comprised of a central computer 27 and one remote computer terminal for each storage facility, a key-card reader 18 for each area in which a vehicle may be stored or parked, and an on-board computer 17, for each vehicle. Input terminal 42 is located in office 41 (see FIG. 2). Each storage facility computer terminal receives information from the local key-card readers 18 and from input terminal 42 which are used by inspection personnel on the line of in-coming vehicles and by personnel who perform service and repair of the vehicles.

Referring further to FIG. 4, each of the control components of the urban transportation system of the invention is shown in its operational relationship to other components. To initiate a rental of vehicle 10, key-card 12 is inserted into key-card reader 18 which verifies its condition through central computer 27, and if key-card 12 is valid and active, key-card reader 18 authorizes key-card 12 to access vehicle 10. Next, key-card 12 is inserted into entry card slot 11 which allows the user access to vehicle 10 and simultaneously activates clock 43 and watt-hour meter 16. Then, upon entering vehicle 10, the user inserts key-card 12 into drive slot 13 which activates odometer input 44. Clock 43, watt-hour meter 16, and odometer input 44 all transmit their information directly to on-board computer 17, situated within vehicle 10. When vehicle 10 returns to a storage facility 20, the information stored in its on-board computer 17 is downloaded to a remote computer terminal and then transmitted to central computer 27 for maintaining records about each vehicle and for invoicing the user for the amount due.

Central computer 27 receives information from key-card readers 18 and from on-board computers 17, either directly or through remote computer terminals. Central computer 27 monitors vehicles 10 via radio link so that each vehicle 10 may be located at any time. Central Computer 27 also activates maintenance alert 45 for scheduled maintenance of each vehicle when urban vehicle 10 is in use. The computer system prepares invoices to the vehicle users by means of output devices 47, e.g. a printer, and records payments via input terminal 42.

There are a number of advantages to having all the urban vehicles of the same physical configuration. First, the user knows what kind of vehicle to expect and can plan accordingly. Second, the vehicles in the various storage facilities and parking areas are interchangeable, thereby allowing a vehicle to be obtained from any storage area or parking area and returned to any other such area in the transportation system. Third, it permits efficient conveyorized handling and compact storage of the vehicles in the storage facility. Fourth, it allows for economies in the purchasing and servicing of the vehicles.

The theft of urban vehicles is deterred by a number of features in the disclosed urban transportation system. First, the central computer continuously tracks the vehicles and knows who was the last vehicle user. If a predetermined time passes without vehicle 10 having been returned to any vehicle storage facility 20, the central computer, by radio contact with the vehicle, first activates a warning to the user via alarm 46 (see FIG. 4) and then some time later, activates an alarm. The urban transportation system has an inherent protection in that normal use of a vehicle does not require it to be in the same location away from a storage facility for any long period of time. If such a situation occurs, it will raise suspicions in the minds of other people, including the police. A variety of exterior colors and patterns of paint on the vehicles may be used to assist in identification. Finally, a vehicle which has a relatively low top speed and a limited driving range is of little market value and not prone to being stolen since a small range is a serious impediment to the use of urban vehicle 10 in a normal manner outside of the transportation system area. In the urban transportation system area, it is not an impediment.

The system disclosed is the first practical way of achieving the goal of many urban areas; that is, to maximize the use of electric or other low pollution vehicles within an urban area. An economical and moderate weight electric vehicle will have a small range, probably on the order of 25 to 30 miles. As noted above, increase in range requires larger batteries which increase the weight and cost, both factors that are undesirable.

Since many variations could be made in the urban transportation system disclosed and many different embodiments of this invention could be made without departing from the scope thereof, it is intended that all matter contained in the above description and accompanying drawings shall be interpreted as being illustrative only and not limiting.

What is claimed is:

1. A hire vehicle transportation system for an urban area in which the users of said system have access to any vehicle within said system, comprising:

(a) a pool of urban electric vehicles each of which has substantially the same size and physical configuration as the other vehicles in the pool;

(b) a number of storage and maintenance facilities located throughout the urban area so as to be convenient to the user of said vehicles;

(c) a number of designated on-street parking areas for said vehicles;

(d) a central computer for assisting in the control and the operation of said vehicles and said facilities;

(e) each said urban vehicle having an on-board computer which receives data from various sources in the vehicle and stores said data for downloading into said central computer; and (f) a key-card reader connected to be in communication with said on-board computer;

wherein said vehicle has a set of extendable electric contacts, which, when said vehicle is on a storage conveyor and said electric contacts are extended, are connected to electric power conductor bars that are positioned in parallel with said storage conveyor in order to charge said vehicle while in the storage facility.

2. The transportation system of claim 1, wherein said vehicles receive their motive power from batteries with only sufficient capacity for a range of driving that is substantially less than the range of other vehicles that are powered by internal combustion engines.

3. The transportation system of claim 1, further comprising a battery status charge meter, calibrated in miles remaining for driving, wherein the battery status charge meter is visible from the interior and the exterior of said vehicle.

4. In conjunction with a transportation system for an urban area, an electric vehicle storage and maintenance facility comprising:

(a) a first conveyor for incoming electric vehicles, said conveyor being operative through a plurality of stations for washing, cleaning and inspecting of said vehicles, and for downloading to a central computer data which are stored in an on-board computer in said vehicles;

(b) an area for the service and repair of said vehicles;

(c) a number of floors for the automatic storage of said vehicles and charging of batteries inside said vehicles; and (d) a second conveyor for presenting a first of said vehicles adjacent an exit door to users of the transportation system in a convenient manner;

wherein said vehicle has a set of extendable electric contacts, which, when said vehicle is on a storage conveyor and said electric contacts are extended, are connected to electric power conductor bars that are positioned in parallel with said storage conveyor in order to charge said vehicle while in the storage facility.

5. The transportation system of claim 4, further comprising an elevator having one or more conveyor tracks assembled thereto and operative for transporting said vehicles to different floors of said storage and maintenance facility.

6. A method for urban transportation, comprising the steps of:

(a) providing a plurality of urban electric vehicles of substantially uniform size and configuration;

(b) providing a plurality of storage and maintenance facilities located at various places around an urban area, said facilities having an entrance door and an exit door and a conveyor therebetween;

(c) mounting a first of said plurality of vehicles that has passed through said entrance door on an entry section of said conveyor;

(d) transporting said first vehicle along said conveyor to a first storage position therealong;

(e) mounting a second of said plurality of vehicles that has passed through said entrance door on said entry section of said conveyor;

(f) transporting said second vehicle along said conveyor to a second storage position immediately adjacent said first storage position; and (g) transporting said first vehicle along said conveyor to said exit door when a vehicle is requested by a user of said vehicles; and further comprising the steps of:

(h) electrically connecting said vehicle to an electric power source when said vehicle is stored in one of said storage and maintenance facilities;

(i) keeping said vehicle in said storage facility for a time sufficient to charge a battery in said vehicle to a desired level of charge; and (j) disconnecting said electric power source from said vehicle when said battery is charged to the desired level of charge;

wherein said vehicle has a set of extendable electric contacts, which, when said vehicle is on a storage conveyor and said electric contacts are extended, are connected to electric power conductor bars that are positioned in parallel with said storage conveyor in order to charge said vehicle while in the storage facility.

7. The method for urban transportation as described in claim 6, further comprising the steps of:

(k) providing to a user of said vehicles a key-card with encoded information identifying said user and authorizing said user to access one of said vehicles;

(l) providing a key-card reader in conjunction with said vehicle and capable of reading said encoded information from said key-card and enabling use of said vehicle if said encoded information is authorizing such use; and (m) providing a stationary key-card reader in conjunction with said storage facility capable of reading said encoded information from said key-card and disabling said vehicle to return said vehicle to said storage facility.

8. The method for urban transportation as described in claim 6, further comprising the steps of:

(k) when said vehicle is returned to said storage facility, determining whether said vehicle requires repair or service;

(l) if said vehicle requires repair, diverting said vehicle from said conveyor to a repair and service floor;

(m) if said vehicle requires service, diverting said vehicle from said conveyor to said repair and service floor; and (n) if said vehicle does not require repair or service, allowing said vehicle to continue on said conveyor to a storage position;

(o) wherein each vehicle is provided with a unique identification.

* * * * *